(12) United States Patent
Keum et al.

(10) Patent No.: US 12,015,327 B2
(45) Date of Patent: Jun. 18, 2024

(54) METHODS, SYSTEMS, AND APPARATUSES FOR PASSIVE END-TURN COOLING FOR AN ELECTRIC MOTOR USING GRAVITY

(71) Applicant: GM GLOBAL TECHNOLOGY OPERATIONS LLC, Detroit, MI (US)

(72) Inventors: SeungHwan Keum, Northville, MI (US); Jun-mo Kang, Ann Arbor, MI (US); Insu Chang, Troy, MI (US); Young J. Kim, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 519 days.

(21) Appl. No.: 17/305,639

(22) Filed: Jul. 12, 2021

(65) Prior Publication Data
US 2023/0010156 A1  Jan. 12, 2023

(51) Int. Cl.
*H02K 9/19* (2006.01)
*B05B 3/00* (2006.01)

(52) U.S. Cl.
CPC ............ *H02K 9/19* (2013.01); *B05B 3/008* (2013.01)

(58) Field of Classification Search
CPC ....... H02K 9/19; H02K 2209/00; B05B 3/008

USPC .......................................................... 310/54
See application file for complete search history.

(56) References Cited

U.S. PATENT DOCUMENTS

| | | | |
|---|---|---|---|
| 2022/0360144 A1* | 11/2022 | Keum | H02K 9/19 |
| 2023/0009660 A1* | 1/2023 | Keum | H02K 7/10 |
| 2023/0020219 A1* | 1/2023 | Chang | H02K 1/20 |

\* cited by examiner

*Primary Examiner* — Daniel C Puentes
*Assistant Examiner* — Minki Chang
(74) *Attorney, Agent, or Firm* — Lorenz & Kopf LLP

(57) ABSTRACT

In various embodiments, methods, systems, and vehicle apparatuses are provided. A system provides a gravity drive to distribute coolant oil flow including a nozzle for directing a flow of coolant oil over a surface of an electric motor wherein the flow of the coolant oil is caused by a gravity drive; a connector that is coupled to the nozzle that enables the nozzle to sway in response to external forces encountered by a vehicle operation and to distribute coolant oil over the exterior surface of the electric motor; and a counterweight that is coupled to the nozzle that provides a countermeasure to the external forces encountered by the vehicle operation to cause the nozzle to sway in a manner that enables the coolant oil distributed evenly across the exterior surface of the electric motor.

20 Claims, 7 Drawing Sheets

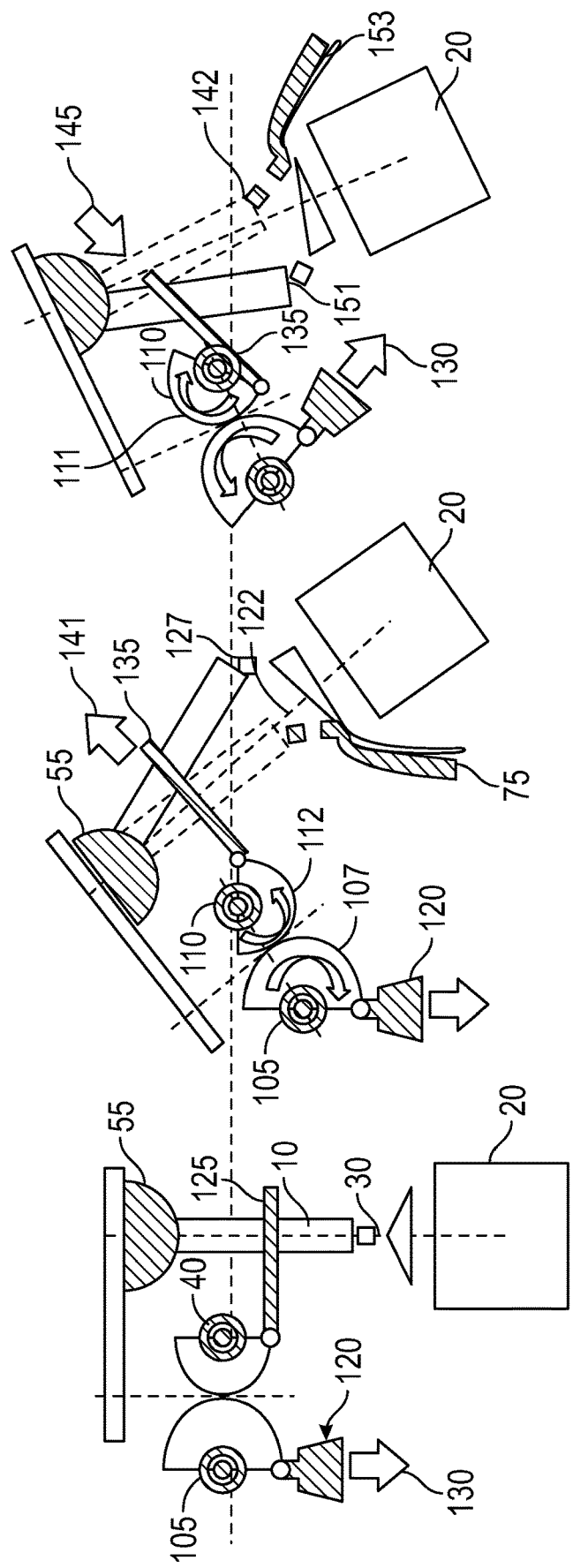

METHODS, SYSTEMS, AND APPARATUSES FOR PASSIVE END-TURN COOLING FOR AN ELECTRIC MOTOR USING GRAVITY

INTRODUCTION

The technical field generally relates to oil-cooled motors and more particularly relates to methods, systems, and apparatuses for flow control of cooling oil to distribute the cooling oil evenly across the winding of a motor stator to prevent the emergence of hotspots that affect the operability and life of the motor.

Electric vehicles (EVs) are becoming commonplace and an alternative to internal combustion engine (ICE) vehicles to lower carbon emissions in the atmosphere. EVs operate via an electric motor powered by battery energy. In instances, the electric motor of an EV may use an oil cooling system. In this case, engine oil is used as a coolant to remove heat from the electric motor. The heat from the motor system is transferred via the heat exchanger from across the surface of the windings of an electric motor.

In a direct oil-cooled motor system, the coolant (oil) contacts the hot surface (i.e., the winding end turn as an example in the oil motor) directly. In an attempt to attain an optimum cooling performance of the oil-cooled motor, it is deemed necessary or optimum to have even coolant oil distribution over the hot surface of the oil motor's winding end turns to remove heat from the desired target region.

However, in a gravity-driven coolant oil flow system, the coolant oil flow direction is subject to external conditions that caused the gravity-driven coolant oil flow to not be distributed evenly over a planar surface or the desired hot surface exposed to the coolant oil flow. For example, the gravity-driven oil flow may be disrupted or disturbed by external factors such as road grade (slope of the road) as well as lateral acceleration at cornering actions of the vehicle. When this type of motion occurs to the vehicle, the translated effect is that the oil flow is no longer a continuous even flow over the winding surface or covering targeted regions. Rather, the oil flow is uneven and can even miss the target region, and the oil coverage, as a result, may, or will be significantly reduced; this, in turn, causes a deteriorating effect on the cooling efficiency. For example, because of the uneven distribution of the oil flow, hot spots may occur from the poor cooling of the motor winding, which may lead to an earlier failure of electric insulations than would normally be expected for the particular type of insulation used in the oil-cooled motor; this may also lead to the overall failure of the oil-cooled motor.

It is desired for a mechanism to improve the coolant oil distribution of a gravity-driven coolant system for a motor that encounters the commonplace negative effects of external forces or disturbances to the coolant oil flow that can be caused as an example by the vehicle traversing uneven surfaces or exhibiting lateral acceleration effects that interrupt or prevent a continuous even flow of the coolant oil over the motor windings.

It is desired to modify the coolant oil flow direction in a manner to counter the effects in disturbances of oil flow caused by different (i.e., not flat) road grades and the lateral acceleration experienced by the vehicle impinging the coolant oil for enhanced oil distribution and improved cooling efficiency.

Furthermore, other desirable features and characteristics of the present invention will become apparent from the subsequent detailed description and the appended claims, taken in conjunction with the accompanying drawings and the foregoing technical field and background.

SUMMARY

A system, apparatus, and method are disclosed for implementing a counterweight to provide countermeasures responsive to external forces and to direct coolant oil flow of a gravity-driven coolant system to a target region of an electric motor.

In one exemplary embodiment, a system that includes a gravity drive to distribute coolant oil flow is provided. The system includes a nozzle for directing a flow of coolant oil over a surface of an electric motor wherein the flow of the coolant oil is caused by the gravity drive; a connector coupled to the nozzle that enables the nozzle to sway in response to external forces encountered by a vehicle operation and to distribute coolant oil over the exterior surface of the electric motor; and a counterweight that is coupled to the nozzle that provides a countermeasure to the external forces encountered by the vehicle operation to cause the nozzle to sway in a manner that enables the coolant oil distributed evenly across the exterior surface of the electric motor.

In at least one exemplary embodiment, the system includes the nozzle coupled to a connector that comprises a pivot to enable the nozzle to swing in an opposite direction by torque applied from the counterweight in response to external forces encountered by the vehicle operation.

In at least one exemplary embodiment, the system includes the counterweight coupled to a set of gears that provides a counterclockwise and a clockwise torque in response to the external forces to cause the nozzle to sway in the manner that enables the coolant oil distributed evenly across the exterior surface of the electric motor.

In at least one exemplary embodiment, the system includes the exterior surface of the electric motor comprising winding end turns of a stator wherein the end turns are distributed with coolant oil evenly by nozzle sway controlled in part by the counterweight.

In at least one exemplary embodiment, the system includes the counterweight comprising a passive device that senses vehicle movement and actuates a countermeasure by providing a counterclockwise and clockwise torque in response to the external forces to cause the nozzle to sway in the manner that enables the coolant oil distributed evenly across the exterior surface of the electric motor.

In at least one exemplary embodiment, the system includes a link that couples the set of gears to the counterweight to reverse the direction of the nozzle sway in response to the external forces to the nozzle generated by the vehicle operation.

In at least one exemplary embodiment, the system includes the set of gears that includes a first gear that is coupled to the counterweight that provides a counterclockwise torque, and a second gear coupled to the first gear and to the link that provides a clockwise torque driver to counter the external forces that cause the nozzle sway to receive a reverse directional force.

In at least one exemplary embodiment, the connector comprises a rubber connector.

In another exemplary embodiment, a vehicle apparatus is provided. The vehicle apparatus includes a gravity drive to distribute coolant oil flow from a nozzle over a surface of an electric motor; a connector coupled to the nozzle that enables the nozzle to sway in response to external forces encountered by a vehicle operation and to distribute coolant oil over the exterior surface of the electric motor; and a counterweight that is coupled to the nozzle that provides a countermeasure to the external forces encountered by the vehicle operation to cause the nozzle to sway in a manner that enables the coolant oil to be distributed evenly across the exterior surface of the electric motor.

In at least one exemplary embodiment, the vehicle apparatus includes the nozzle coupled to a connector that comprises a pivot to enable the nozzle to swing in an opposite direction by torque applied from the counterweight in response to external forces encountered by the vehicle operation.

In at least one exemplary embodiment, the vehicle apparatus includes the counterweight coupled to a set of gears that provides a counterclockwise and a clockwise torque in response to the external forces to cause the nozzle to sway in the manner that enables the coolant oil distributed evenly across the exterior surface of the electric motor.

In at least one exemplary embodiment, the vehicle apparatus includes the exterior surface of the electric motor comprising winding end turns of a stator wherein the end turns are distributed with coolant oil evenly by nozzle sway controlled in part by the counterweight.

In at least one exemplary embodiment, the vehicle apparatus includes the counterweight, that includes a passive system that senses vehicle movement and actuates a countermeasure by providing a counterclockwise and clockwise torque in response to the external forces to cause the nozzle to sway in a manner that enables the coolant oil distributed evenly across the exterior surface of the electric motor.

In at least one exemplary embodiment, the vehicle apparatus includes a bar that couples the set of gears to the counterweight to reverse the direction of the nozzle sway in response to the external forces to the nozzle generated by the vehicle operation.

In at least one exemplary embodiment, the set of gears includes a first gear that is coupled to the counterweight that provides a counterclockwise torque and a second gear coupled to the first gear and to the link that provides a clockwise torque driver to counter the external forces that cause the nozzle sway to receive a reverse directional force.

In at least one exemplary embodiment, the vehicle apparatus includes the bar that acts like a sway bar to counter nozzle movement.

In yet another exemplary embodiment, a method to distribute coolant oil evenly across an exterior surface of an electric motor is provided. The method includes directing a flow of coolant oil by a nozzle using a gravity drive over the exterior surface of the electric motor; coupling the nozzle to a rubber connector that enables the nozzle to sway in response to external forces encountered by a vehicle movement and to distribute coolant oil over the exterior surface of the electric motor wherein the external forces are resultant from road gradients and vehicle accelerations; and coupling a counterweight to the nozzle to provide a countermeasure to the external forces to cause the nozzle to sway in a manner that enables the coolant oil to be distributed evenly across the exterior surface of the electric motor.

In at least one exemplary embodiment, the method includes the connector that comprises a pivot mechanism to enable the nozzle to swing in an opposite direction by torque applied from the counterweight in response to external forces.

In at least one exemplary embodiment, the method includes coupling the counterweight to a set of gears that provides a counterclockwise and a clockwise torque in response to the external forces to cause the nozzle to sway in a manner that enables the coolant oil distributed evenly across the exterior surface of the electric motor.

In at least one exemplary embodiment, the method includes the exterior surface of the electric motor that comprises winding end turns of a stator; and the end turns are distributed with coolant oil evenly by nozzle sway controlled in part by the counterweight.

BRIEF DESCRIPTION OF THE DRAWINGS

The exemplary embodiments will hereinafter be described in conjunction with the following drawing figures, wherein like numerals denote like elements, and wherein:

FIGS. 3A, 3B, and 3C illustrate exemplary diagrams of application of the counterweight in response to different external forces caused by vehicle operation for flow distribution of the coolant oil via the nozzle over the external surface of the electric motor in accordance with an exemplary embodiment;

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

The present disclosure describes systems, apparatuses, and methods for a gravity-driven coolant flow system to prevent the coolant oil from missing the design target location of a hot surface of an electric motor when there are external disturbances such as a nonzero road grade and/or lateral acceleration from cornering. In this instance, the flow direction is controlled by torque forces from the counterweight to counter the disturbances caused by the external forces.

The present disclosure describes systems, apparatuses, and methods for a gravity-driven coolant flow system that operates as a passive system and does not require active sensors, actuators, and controllers that can increase the cost and complexity of the cooling oil system.

The present disclosure describes systems, apparatuses, and methods for a gravity-driven coolant flow system that serves as both the sensor and the actuator as the counterweight follows a motion path to sway, oscillate, or yo-yo in the direction of the acceleration or other external forces. The nozzle is connected to the counterweight with a set of two gears that reverse the direction of the counterweight or pendulum to cause the nozzle direction to be shifted to the opposite of the acceleration which counters the disturbance.

Figure 1A:
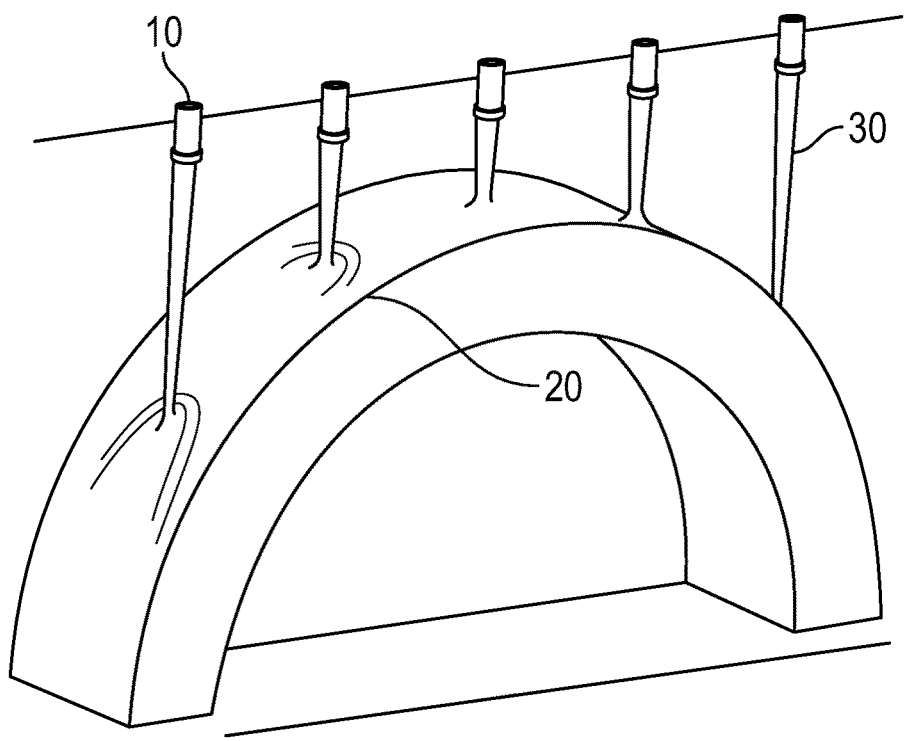
FIGS. 1A and 1B illustrate an exemplary diagram of side views of wetted areas representing the surface of the end turn windings of the stator of an electric motor that change in accordance with different accelerations of an electric vehicle of exemplary embodiments.
Figure 1B:
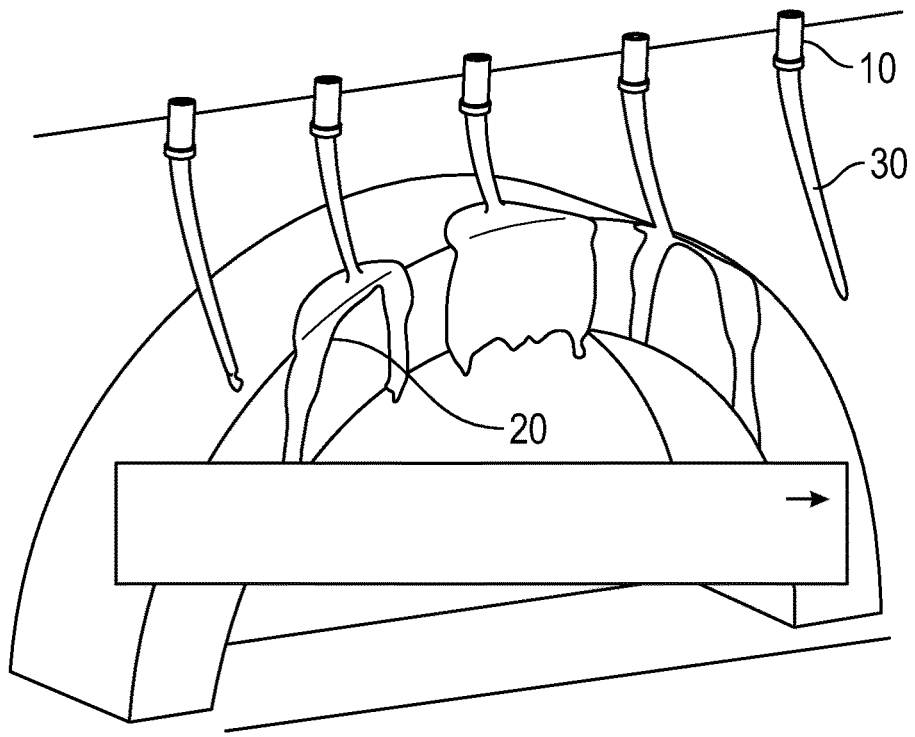

FIGS. 1A and 1B illustrate side views of wetted areas (of coolant oil) representing the surface of the end turn windings of the stator of an electric motor that change in accordance with different accelerations of an electric vehicle of exemplary embodiments. In FIG. 1A there is shown a nozzle 10 to distribute a flow of coolant oil over a hot surface or planar area (e.g. end turn windings) of an electric motor where the flow of the coolant oil is caused by a gravity drive. The coolant oil flow 30 is distributed evenly over surface 20 with the coolant oil directed to multiple target regions on surface 20 because there are no external disturbances caused by the zero lateral acceleration. In FIG. 1B, there is shown a significant reduction in coolant oil over multiple target regions of the surface 20 because the coolant oil flow 30 is swayed away from the target regions because of forces applied by vehicle acceleration (in this case, 1G lateral acceleration). This results in a significant reduction in the wetted area that is exposed to the coolant oil and this, in turn, causes poor cooling performance.

Figure 2:
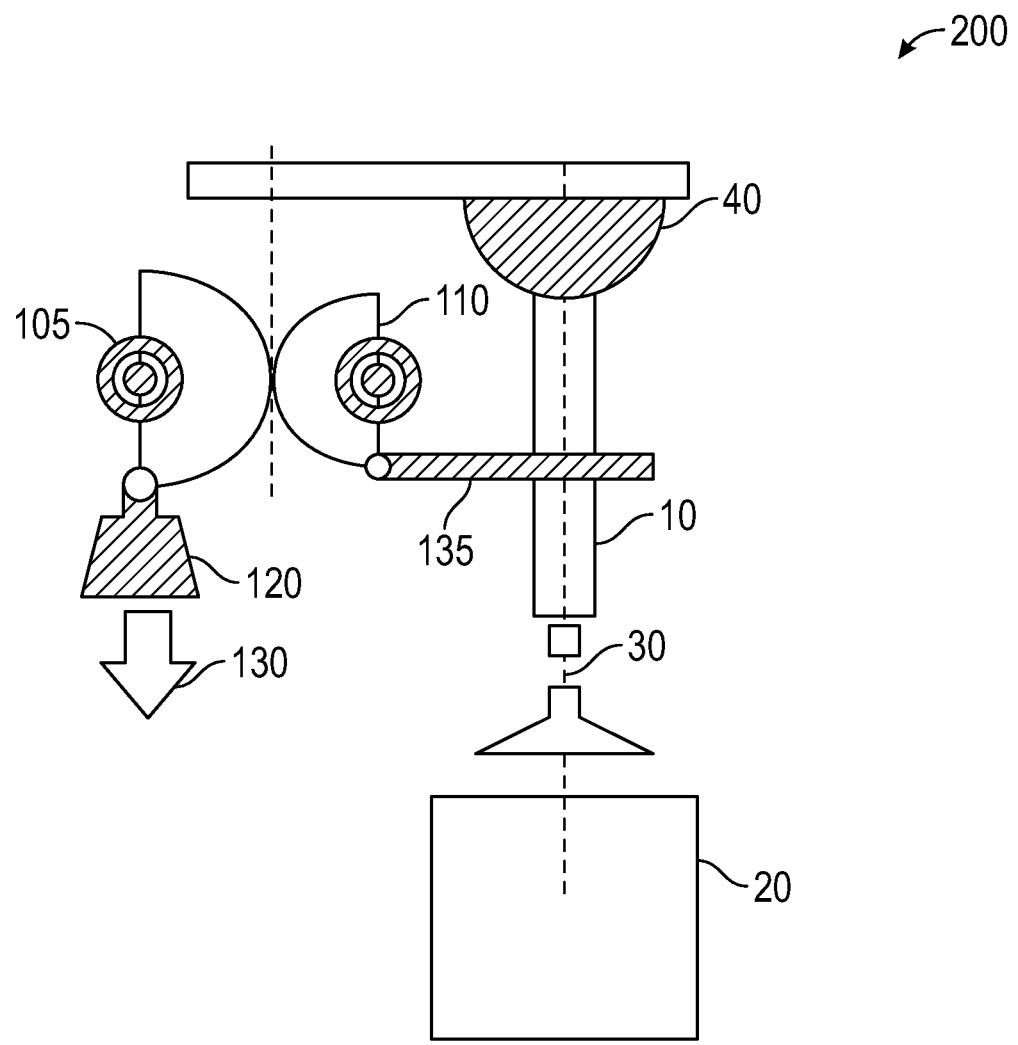
FIG. 2 illustrates an exemplary diagram of a side view of a wetted area representing the surface of the end turn windings of the stator of an electric motor in accordance with an exemplary embodiment.

FIG. 2 illustrates an exemplary diagram of a side view of a wetted area representing the surface of the end turn windings of the stator of an electric motor in accordance with an exemplary embodiment. In FIG. 2, in the side view exemplary diagram, there is a coolant oil gravity drive system 200 that includes a damping element or connector 40 (which includes the pivot mechanism to sway the nozzle 10) that can be made of rubber for a dampening effect to absorb energies of external forces caused by disturbance, to enable the nozzle 10 to operate in a pivot or back and forth operation and to control the nozzle direction. The first gear 105 is connected to the counterweight 120 and exerts a downward force 130 and a second gear 110 that is coupled to the first gear 105 and the link 135 (or alternately, a sway-like bar). Link 135 applies a clockwise torque force to nozzle 10 that is coupled to link 135 that directs the coolant oil flow over the hot surface of the electric motor.

FIGS. 3A, 3B, and 3C illustrate exemplary diagrams of application of the counterweight in response to different external forces caused by vehicle operation for flow distribution of the coolant oil via the nozzle over the external surface of the electric motor in accordance with an exemplary embodiment. In FIG. 3A, the first gear 105 and the second gear 110 are in a relaxed position not exerting a clockwise or counterclockwise torque on the nozzle 10 to cause any change of direction in a forward or backward position. That is the nozzle 10 is positioned in a perpendicular position to direct and distribute the coolant oil at a target region on the surface 20 without any counterweight forces to counter any external forces caused by acceleration or road grade. The counterweight (sinker) 120 is directing a perpendicular force downward and no lateral forces are directed across the link 125 to position the target region and the target region in this neutral position is below the nozzle 10 and the coolant oil is directed directly with modification in direction to the surface 20 of the electric motor.

In FIG. 3B, in an exemplary scenario on a tilted road or road with gradient, the counterweight 120 is directed downward, the exemplary directional arrows are indicative of a net force. In the exemplary embodiment, the first gear 105 exerts a (clockwise) torque 107, and a (counterclockwise) torque 112 is applied (via the second gear 110) to the link 135 to cause the nozzle to direct the coolant oil flow 75 from an initial nozzle position 122 to a new nozzle position 127 and to distribute coolant oil over the target region of the surface 20, which is an external surface. In this case, the clockwise torque 107 of the first gear 105 generated by the counterweight 120 is in response to the lateral force to direct an opposite lateral force 141 via the link 135 to the nozzle 10 to change the nozzle direction.

FIG. 3C, in an exemplary scenario of a vehicle moving at a corner motion path, the first gear 105 exerts a (counterclockwise) torque 107, and a (clockwise) torque 111 is applied via the second gear 110 to the link 135 to cause the nozzle to direct the oil coolant flow 153 from an initial nozzle position 151 to a new nozzle position 142 and to the distribute coolant oil over the target region of the surface 20. In this case, the counterclockwise torque 107 of the first gear is generated by the counterweight 120 in response to the sensed lateral force to direct the opposition lateral force 145 via the link 135 to the nozzle 10 to change the nozzle direction.

Figure 4A:
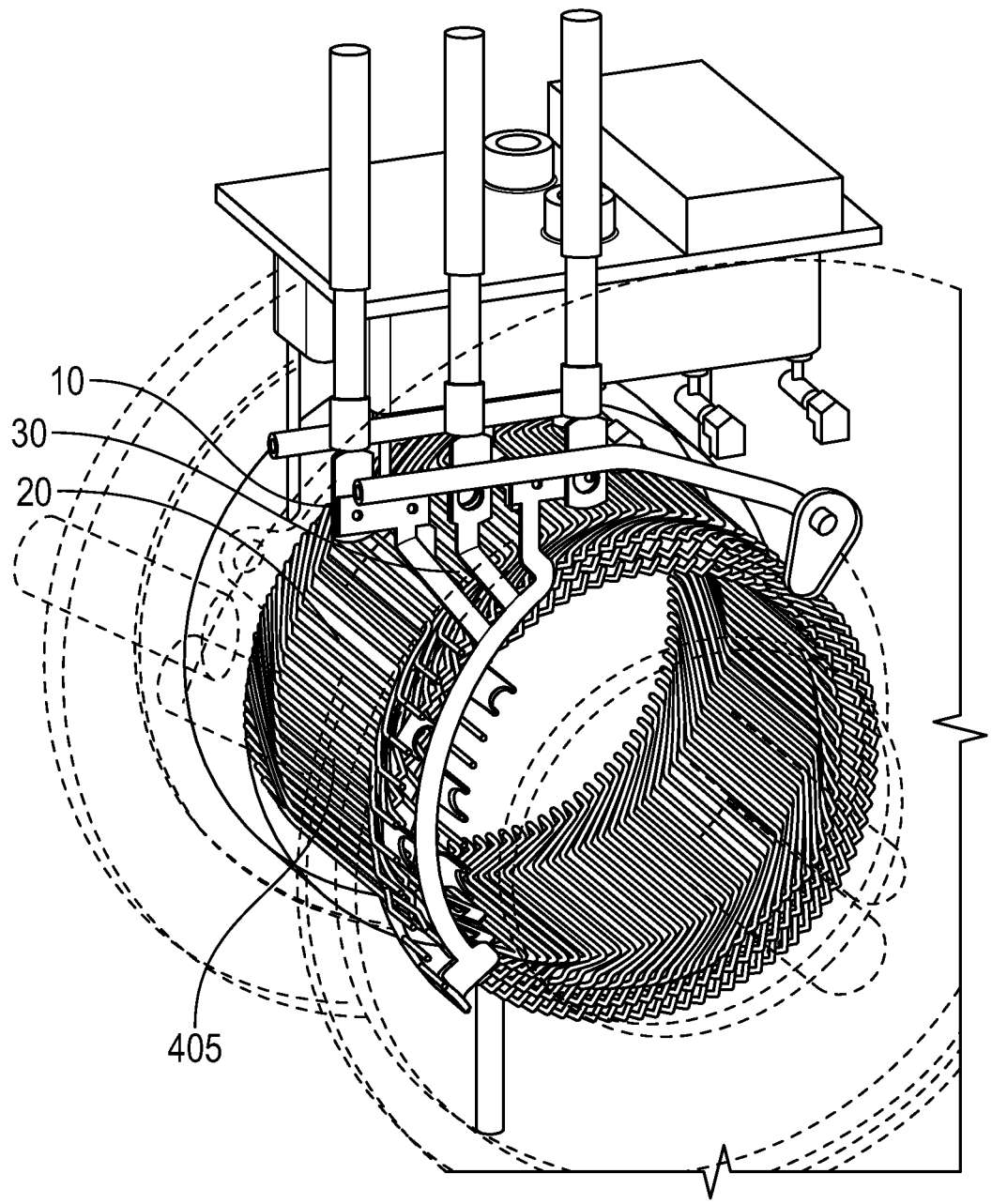
FIGS. 4A, 4B, and 4C illustrate exemplary diagrams of side views of the gravity drive coolant system with flow across the end turn windings of the stator of an electric motor in accordance with an exemplary embodiment.
Figure 4B:
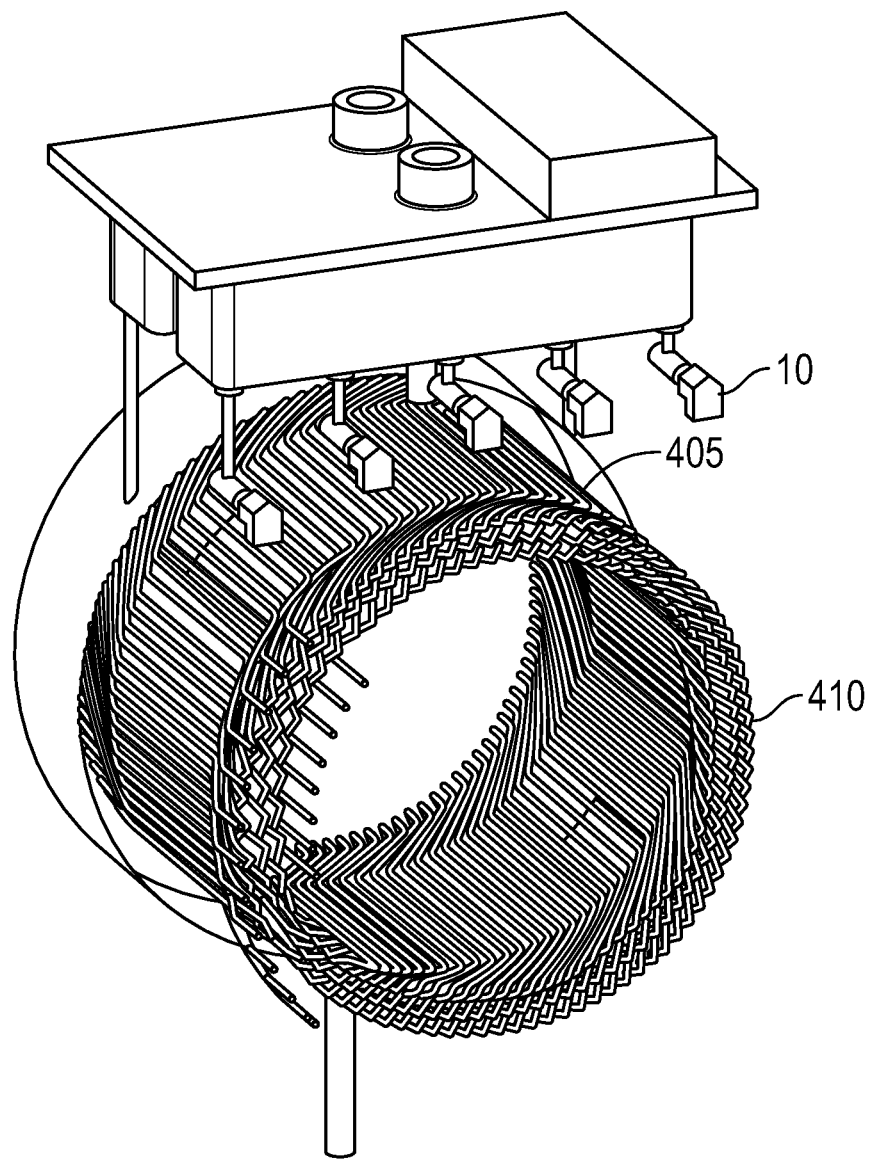
Figure 4C:
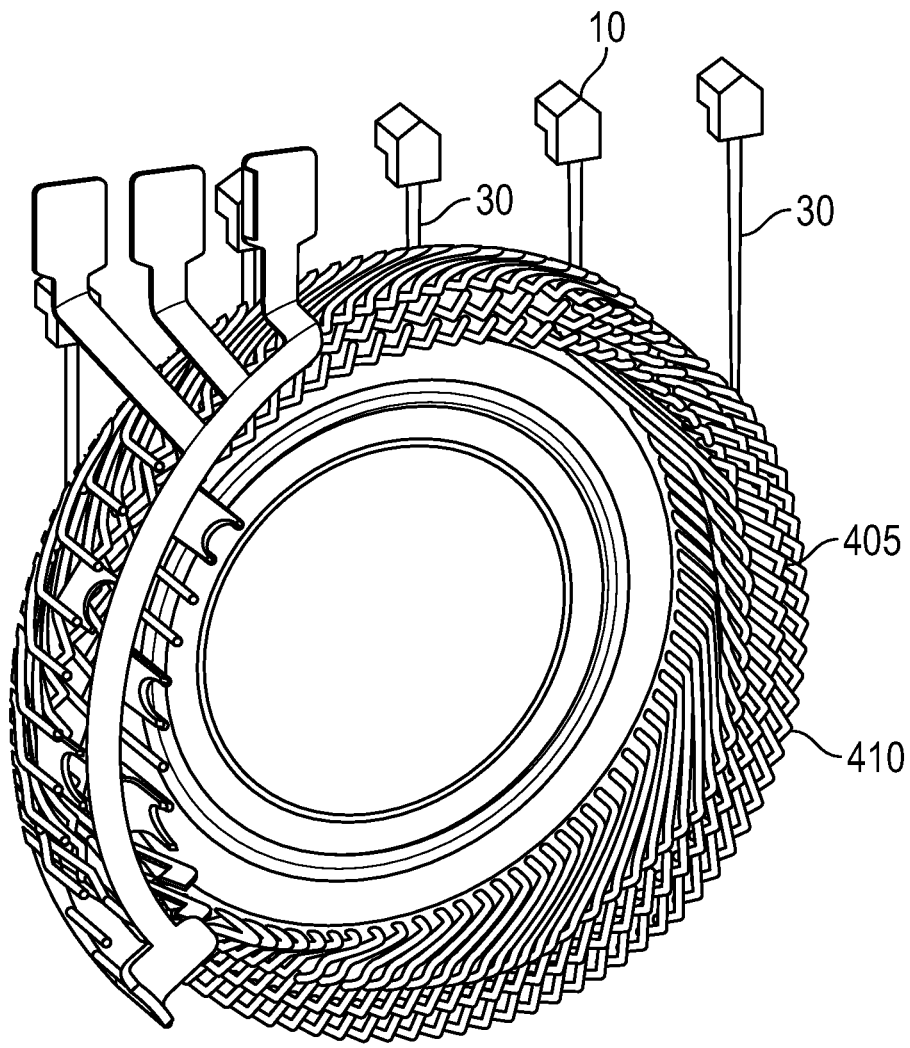

FIGS. 4A, 4B, and 4C illustrate exemplary diagrams of side views of the gravity drive oil coolant system with flow across the end turn windings of the stator of an electric motor in accordance with an exemplary embodiment; and FIG. 4A illustrates a side view of an electric motor with a gravity drive oil coolant system that includes nozzle 10, end turn windings 405, surface 20, and directed coolant oil flow 30. In this case, the end turn is where the conductors (windings) make turns to be connected to other straight parts. The cooling from the oil coolant flow occurs for the most part over the end turn because it is the only area that is exposed to the oil coolant via nozzle 10. FIG. 4B illustrates another side of an electric motor that includes stator 410, nozzle 10, and end turn windings 405. Finally, FIG. 4C includes a stator 410, end turn windings 405, and the coolant oil flow 30 over the exposed end turns (i.e., the targeted region).

Figure 5:
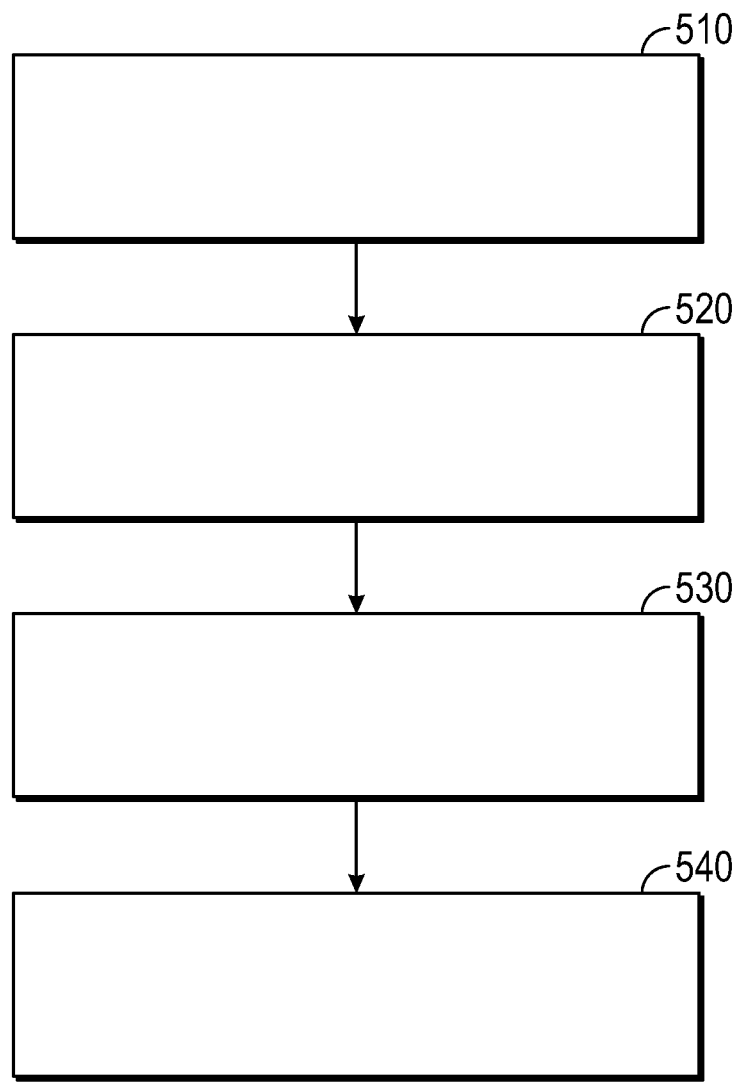
FIG. 5 illustrates an exemplary flowchart of counterweight torques in response to different external forces caused by vehicle operation for flow distribution of the coolant oil via the nozzle over the external surface of the electric motor in accordance with an exemplary embodiment.

FIG. 5 illustrates an exemplary flowchart of counterweight torques in response to different external forces caused by vehicle operation for flow distribution of the coolant oil via the nozzle over the external surface of the electric motor in accordance with an exemplary embodiment. In the flow diagram of FIG. 5, at step 510, the counterweight senses external force disturbances that cause the coolant oil flow to shift from the target region and to prevent the even distribution of coolant oil over the end turn windings of the stator of the electric motor. The external forces that are sensed include acceleration and forces from road grade changes.

In response to the sensed external forces, at step 520, the gravity drive mechanism is actuated passively via the counterweight that is coupled to a set of gears. The set of gears is composed of a first gear that applies a torque (e.g. a clockwise torque), and a second gear that applies a different torque (e.g. counterclockwise torque). At step 530, the nozzle direction is repositioned in a manner to distribute coolant oil evenly of the external surface of end turns of the electric motor that are directed to the nozzle flow. At step 540, the nozzle direction is toggled or pivoted across the exposed surface of the electric motor to direct the coolant oil efficiently over or to evenly distribute the coolant oil over the exposed surface.

In an exemplary embodiment, the nozzle is connected to a rubber connector that exhibits a dampening effect of lateral forces that sway the nozzle. Further, the nozzle exhibits a sway action in response to external forces encountered by a vehicle movement to distribute coolant oil over the exterior surface of the electric motor. The external forces are resultant from road gradients and vehicle accelerations. The counterweight connected via a set of gears to the nozzle provides a countermeasure to the external forces to cause the nozzle to sway to direct and distribute coolant oil evenly across the exterior surface of the electric motor. The rubber connector includes a pivot mechanism to enable the nozzle to swing in an opposite direction by torque applied from the counterweight in response to external forces. The set of gears provides a counterclockwise and a clockwise torque in response to the external forces to cause the nozzle to sway so that the coolant oil is distributed evenly across the exterior surface of the electric motor.

It should be appreciated that the process of FIG. 5 may include any number of additional or alternative tasks, the tasks are shown in FIG. 5 need not be performed in the illustrated order, and the process of FIG. 5 may be incorporated into a more comprehensive procedure or process having additional functionality not described in detail herein. Moreover, one or more of the tasks shown in FIG. 5 may be omitted from an embodiment of the process shown in FIG. 5 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes may be made in the function and arrangement of elements without departing from the scope of the disclosure as set forth in the appended claims and the legal equivalents thereof.

What is claimed is:

1. A system that provides a gravity drive to distribute coolant oil flow in an apparatus, comprising:
    a nozzle for directing a flow of coolant oil over an exterior surface of an electric motor wherein the flow of the coolant oil is caused by the gravity drive;
    a connector coupled to the nozzle that enables the nozzle to sway in response to external forces encountered by an operation of the apparatus, and to distribute coolant oil over the exterior surface of the electric motor; and
    a counterweight that is coupled to the nozzle that provides a countermeasure to the external forces encountered by the operation to cause the nozzle to sway in a manner that enables the coolant oil to be distributed evenly across the exterior surface of the electric motor.

2. The system of claim 1, further comprising:
    the nozzle coupled to the connector, the connector comprises a pivot to enable the nozzle to swing in an opposite direction to torque applied from the counterweight in response to external forces encountered by the operation.

3. The system of claim 2, further comprising:
    the counterweight coupled to a set of gears that provides a counterclockwise and a clockwise torque in response to the external forces to cause the nozzle to sway in the manner that enables the coolant oil distributed evenly across the exterior surface of the electric motor.

4. The system of claim 3, further comprising:
    the exterior surface of the electric motor comprises winding end turns of a stator wherein the end turns are distributed with coolant oil evenly by nozzle sway controlled in part by the counterweight.

5. The system of claim 4, further comprising:
    the counterweight comprises a passive device that senses apparatus movement and actuates a countermeasure by providing a counterclockwise and clockwise torque in response to the external forces to cause the nozzle to sway in the manner that enables the coolant oil distributed evenly across the exterior surface of the electric motor.

6. The system of claim 5, further comprising:
    a link that couples the set of gears to the counterweight to reverse the direction of the nozzle sway in response to the external forces to the nozzle generated by the operation.

7. The system of claim 6, wherein the set of gears comprises a first gear that is coupled to the counterweight that provides a counterclockwise torque, and a second gear coupled to the first gear and to the link that provides a clockwise torque driver to counter the external forces that cause the nozzle sway to receive a reverse directional force.

8. The system of claim 7, wherein the connector comprises a rubber connector.

9. A vehicle apparatus comprising:
    a gravity drive to distribute coolant oil flow from a nozzle over an exterior surface of an electric motor;
    a connector coupled to the nozzle that enables the nozzle to sway in response to external forces encountered by a vehicle operation and to distribute coolant oil over the exterior surface of the electric motor; and
    a counterweight that is coupled to the nozzle that provides a countermeasure to the external forces encountered by the vehicle operation to cause the nozzle to sway in a manner that enables the coolant oil to be distributed evenly across the exterior surface of the electric motor.

10. The vehicle apparatus of claim 9, further comprising:
    the nozzle coupled to the connector that comprises a pivot to enable the nozzle to swing in an opposite direction by torque applied from the counterweight in response to external forces encountered by the vehicle operation.

11. The vehicle apparatus of claim 10, further comprising:
    the counterweight coupled to a set of gears that provides a counterclockwise and a clockwise torque in response to the external forces to cause the nozzle to sway in the manner that enables the coolant oil distributed evenly across the exterior surface of the electric motor.

12. The vehicle apparatus of claim 11, further comprising:
the exterior surface of the electric motor comprises winding end turns of a stator wherein the end turns are distributed with coolant oil evenly by nozzle sway controlled in part by the counterweight.

13. The vehicle apparatus of claim 12, further comprising:
the counterweight comprises a passive system that senses vehicle movement and actuates a countermeasure by providing a counterclockwise and clockwise torque in response to the external forces to cause the nozzle to sway in a manner that enables the coolant oil to be distributed evenly across the exterior surface of the electric motor.

14. The vehicle apparatus of claim 13, further comprising:
a bar that couples the set of gears to the counterweight to reverse the direction of the nozzle sway in response to the external forces to the nozzle generated by the vehicle operation.

15. The vehicle apparatus of claim 14, wherein the set of gears comprises a first gear that is coupled to the counterweight that provides a counterclockwise torque, and a second gear coupled to the first gear and to the link that provides a clockwise torque driver to counter the external forces that cause the nozzle sway to receive a reverse directional force.

16. The vehicle apparatus of claim 15, wherein the bar acts like a sway bar to counter nozzle movement.

17. A method to distribute coolant oil evenly across an exterior surface of an electric motor of an apparatus, comprising:

directing a flow of coolant oil by a nozzle using a gravity drive over the exterior surface of the electric motor;
coupling the nozzle to a rubber connector that enables the nozzle to sway in response to external forces encountered by a movement of the apparatus and to distribute coolant oil over the exterior surface of the electric motor wherein the external forces are resultant from gradients and apparatus accelerations; and
coupling a counterweight to the nozzle to provide a countermeasure to the external forces to cause the nozzle to sway in a manner that enables the coolant oil to be distributed evenly across the exterior surface of the electric motor.

18. The method of claim 17, further comprising:
wherein the rubber connector comprises a pivot mechanism to enable the nozzle to swing in an opposite direction by torque applied from the counterweight in response to external forces.

19. The method of claim 18, further comprising:
coupling the counterweight to a set of gears that provides a counterclockwise and a clockwise torque in response to the external forces to cause the nozzle to sway in a manner that enables the coolant oil distributed evenly across the exterior surface of the electric motor.

20. The method of claim 19, further comprising:
wherein the exterior surface of the electric motor comprises winding end turns of a stator; and
wherein the end turns are distributed with coolant oil evenly by nozzle sway controlled in part by the counterweight.

* * * * *